United States Patent
Wang (10) Patent No.: US 10,887,746 B2
(45) Date of Patent: Jan. 5, 2021

(54) METHOD, APPARATUS AND SYSTEM OF CONFIGURING WIRELESS NETWORK NODE

(71) Applicant: OPPLE LIGHTING CO., LTD., Shanghai (CN)

(72) Inventor: Zhi Wang, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 16/685,686

(22) Filed: Nov. 15, 2019

(65) Prior Publication Data

US 2020/0084606 A1    Mar. 12, 2020

Related U.S. Application Data

(63) Continuation of application No. PCT/CN2018/085641, filed on May 4, 2018.

(30) Foreign Application Priority Data

May 18, 2017  (CN) .......................... 2017 1 0352994
May 18, 2017  (CN) ..................... 2017 2 0555865 U (51) Int. Cl.
   *H04W 76/14*    (2018.01)
   *H04B 5/00*     (2006.01)
   (Continued)

(52) U.S. Cl.
   CPC ............ *H04W 4/80* (2018.02); *H04B 17/318* (2015.01); *H04L 5/0055* (2013.01); *H04W 8/005* (2013.01);
   (Continued)

(58) Field of Classification Search
   CPC ....... H04W 4/80; H04W 8/005; H04W 24/02; H04W 48/10; H04W 48/16; H04W 52/46;
   (Continued)

(56) References Cited

U.S. PATENT DOCUMENTS 6,954,780 B2 * 10/2005 Susai .................. H04L 67/1008
                                                                709/203
9,351,154 B1 *  5/2016 Steve .................... H04W 76/14
(Continued)

FOREIGN PATENT DOCUMENTS

| CN | 104898449 A | 9/2015 |
| CN | 106664668 A | 5/2017 |
| CN | 107205210 A | 9/2017 |

OTHER PUBLICATIONS

International Search Report (including English translation) and Written Opinion issued in PCT/CN2018/085641, dated Jul. 12, 2018, 9 pages.

*Primary Examiner* — Andrew Wendell
(74) *Attorney, Agent, or Firm* — Arch & Lake LLP (57) ABSTRACT

The present disclosure provides a method, an apparatus, and a system of configuring a wireless network node, and a computer readable medium. The method is applicable to a wireless network configuration device having a BLE function, and includes: determining a communication range of the BLE function based on a preset parameter; activating the BLE function, and sending a configuration request to each of wireless network node devices within the determined BLE communication range; receiving an acknowledgment message returned by a wireless network node device in response to the configuration request, and establishing a BLE connection with the wireless network node device that meets a preset condition.

18 Claims, 5 Drawing Sheets

(51) Int. Cl.
*H04W 4/80* (2018.01)
*H04B 17/318* (2015.01)
*H04L 5/00* (2006.01)
*H04W 8/00* (2009.01)
*H04W 24/04* (2009.01)
*H04W 48/10* (2009.01)
*H04W 48/16* (2009.01)
*H04W 52/46* (2009.01)
*H04W 72/04* (2009.01)
*H04W 84/18* (2009.01)

(52) U.S. Cl.
CPC ........... *H04W 24/04* (2013.01); *H04W 48/10* (2013.01); *H04W 48/16* (2013.01); *H04W 52/46* (2013.01); *H04W 72/0406* (2013.01); *H04W 84/18* (2013.01)

(58) Field of Classification Search
CPC ... H04W 72/0406; H04W 84/18; H04W 4/50; H04W 8/00; H04W 76/14; H04B 17/318; H04B 5/0056; H04L 1/00; H04L 5/0055
See application file for complete search history.

(56) References Cited

U.S. PATENT DOCUMENTS

| | | | |
|---|---|---|---|
| 2001/0021929 A1* | 9/2001 | Lin | G06F 16/24 |
| 2002/0019725 A1* | 2/2002 | Petite | H04W 8/26 |
| | | | 702/188 |
| 2009/0040988 A1* | 2/2009 | Mir | H04L 69/163 |
| | | | 370/338 |
| 2016/0066273 A1* | 3/2016 | Prats | H04W 24/02 |
| | | | 370/311 |
| 2016/0182803 A1 | 6/2016 | Song | |
| 2016/0227097 A1* | 8/2016 | Tanaka | H04N 1/00103 |
| 2016/0262193 A1* | 9/2016 | Hariharan | H04W 4/80 |
| 2016/0374123 A1* | 12/2016 | Arvidson | H04W 48/12 |
| 2017/0134504 A1* | 5/2017 | Takahashi | H04L 67/04 |
| 2017/0245351 A1* | 8/2017 | Leinen | H05B 45/10 |
| 2017/0288786 A1* | 10/2017 | Al-Mousa | H04B 11/00 |
| 2017/0374623 A1* | 12/2017 | Dhar | H04W 52/146 |
| 2018/0027598 A1* | 1/2018 | Roquemore, III | H04W 76/10 |
| | | | 370/254 |
| 2018/0295564 A1* | 10/2018 | Madan | G06Q 20/3224 |
| 2019/0082038 A1* | 3/2019 | Ma | H04W 48/08 |
| 2019/0090093 A1* | 3/2019 | Odejerte, Jr. | H04W 4/80 |

* cited by examiner

METHOD, APPARATUS AND SYSTEM OF CONFIGURING WIRELESS NETWORK NODE

CROSS-REFERENCE TO RELATED APPLICATIONS

This application is based upon and claims the priority of PCT patent application No. PCT/CN2018/085641 filed on May 4, 2018 which claims the priority of Chinese Patent Application No. 201710352994.7 filed on May 18, 2017, and Chinese Patent Application No. 201720555865.3 filed on May 18, 2017, the entire content of all of which is hereby incorporated by reference herein for all purposes.

TECHNICAL FIELD

The present disclosure relates to the application field of wireless communication technologies, and more particularly to a method, an apparatus, and a system of configuring a wireless network node.

BACKGROUND

In the wireless network node configuration process of a commercial lighting system, due to the large number of nodes (generally more than 20 nodes), how to efficiently and securely configure each network node, such as naming network nodes, grouping network nodes, setting scenes of network nodes, and configuring parameters of sensors of network nodes, and the like, is of great importance.

SUMMARY

The present disclosure provides a method, an apparatus and a system of configuring a wireless network node.

According to one aspect, a method of configuring a wireless network node is provided. The method may be applied to a wireless network configuration device having a Bluetooth low energy (BLE) function. The method may include determining a communication range of the BLE function based on a preset parameter; activating the BLE function, and sending a configuration request to each of wireless network node devices within the determined BLE communication range; and receiving an acknowledgment message returned by a wireless network node device in response to the configuration request and establishing a BLE connection with the wireless network node device that meets a preset condition According to another aspect, an apparatus of configuring a wireless network node is provided. The apparatus may be applicable to a wireless network configuration device having a BLE function. The apparatus may include a parameter determiner that determines a communication range of the BLE function based on a preset parameter; a request sender connected to the parameter determiner, where the request sender may activate the BLE function and may send a configuration request to each of wireless network node devices within the determined BLE communication range; and a connector connected to the request sender, where the connector may receive an acknowledgement message returned by a wireless network node device in response to the configuration request of the request sender and may establish a BLE connection with the wireless network node device that meets a preset condition.

According to a third aspect, a system of configuring a wireless network node is provided. The system may include a wireless network configuration device and at least one wireless network node device, and the at least one wireless network node device has a BLE function.

The wireless network configuration device may determine a communication range of the BLE function based on a preset parameter; the wireless network configuration device may activate the BLE function and may send a configuration request to each of the at least one wireless network node device within the determined BLE communication range; the wireless network node device receiving the configuration request may send an acknowledgement message to the wireless network configuration device so as to confirm that the configuration request is received; and the wireless network configuration device may receive the acknowledgement message returned by the wireless network node device, and may establish a BLE connection with the wireless network node device that meets a preset condition.

It is to be understood that both the foregoing general description and the following detailed description are exemplary and explanatory only and are not restrictive of the present disclosure.

BRIEF DESCRIPTION OF THE DRAWINGS

In order to clearly illustrate the technical solution of the examples of the present disclosure, the drawings of the examples will be briefly described in the following; it is obvious that the described drawings are only related to some examples of the present disclosure, and those skilled in the art may obtain other drawings based on these drawings without any inventive work.

DETAILED DESCRIPTION

In order to make objects, technical details and advantages of the examples of the present disclosure apparent, the technical solutions of the examples will be described in a clearly and fully understandable way in connection with the drawings related to the examples of the present disclosure. Apparently, the described examples are just a part but not all of the examples of the present disclosure. Based on the described examples herein, those skilled in the art may obtain other example(s), without any inventive work, which should be within the scope of the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

There are many shortcomings in some wireless network node configuration methods. For example, the configuring of a large number of wireless network nodes is usually performed online, which is inefficient. For example, in the process of configuring a network node through Wi-Fi, because of the large broadcast range and a large number of nodes in the broadcast range, it is difficult to configure a specified node due to the problem of identifying the large number of network nodes, and the complexity of the technology will be increased if an infrared technology or other assistive technologies are used. In addition, because communication distances in configuring networks are usually long, and information is transmitted in cleartext in the process of configuring networks, the long communication distances make secret keys vulnerable to eavesdropping, thereby making the wireless network vulnerable to malicious intrusion. Moreover, sometimes, the installer may be required to be familiar with the use of the application (APP) associated with the configuration of network nodes and the parameter configuration of the wireless network nodes, and the complex network increases the technical requirements and training costs for the installer.

Figure 1:
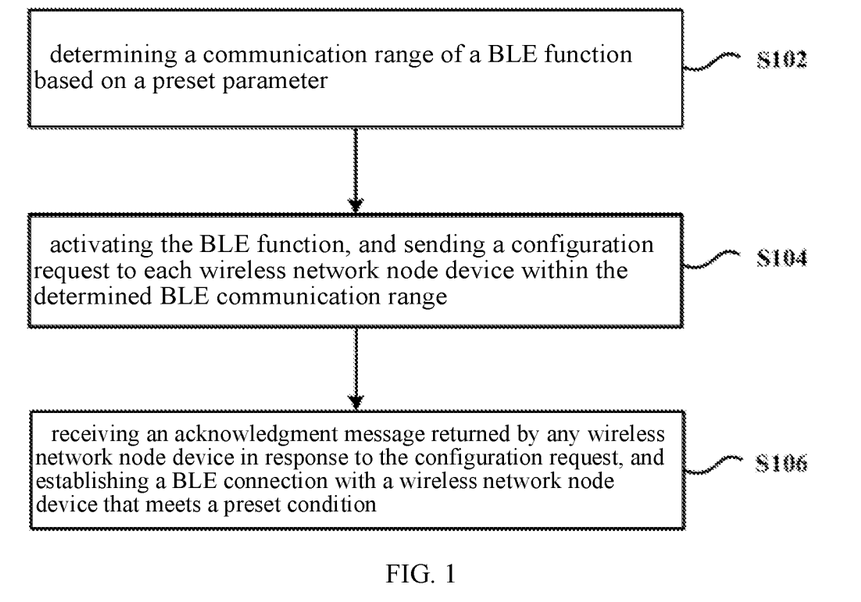
FIG. 1 is a flow chart illustrating a method of configuring a wireless network node according to an example of the present disclosure.

An example of the present disclosure provides a method of configuring a wireless network node, the method is applicable to a wireless network configuration device having a Bluetooth Low Energy (BLE) function, and the wireless network configuration device may be a handheld terminal device or other mobile devices (e.g., smart phones, tablets, smart watches, and the like). FIG. 1 is a flow chart illustrating a method of configuring a wireless network node according to an example of the present disclosure. Referring to FIG. 1, the method includes steps S102 to S106.

Step S102, determining a communication range of a BLE function based on a preset parameter.

In this step, the preset parameter may be a parameter of a communication range in which the wireless network configuration device performs communication by using the BLE function. For example, if the preset parameter is 2 meters, the BLE communication range of the wireless network configuration device is set to 2 meters by using the preset parameter. In this case, the wireless network configuration device may communicate with each wireless network node device within the range of 2 meters. BLE technology is a low-cost, short-distance, interoperable and robust wireless technology that operates in the license-free 2.4 GHz ISM radio frequency band.

Step S104, activating the BLE function, and sending a configuration request to each wireless network node device within the determined BLE communication range.

In this step, the wireless network node device may be a sensor or other device that requires parameter configuration, such as a sensor (e.g., a photoelectric sensor that controls a lighting fixture), a wireless communication module installed inside the lighting fixture for remotely controlling the lighting fixture, controlling the opening, closing, adjusting brightness or color of the lighting device based on a control signal received by the wireless communication module. Moreover, the wireless network node device also has the BLE function to achieve communication with a wireless network configuration device having a BLE function.

Step S106, receiving an acknowledgement message returned by any wireless network node device in response to the configuration request, and establishing a BLE connection with the wireless network node device that meets a preset condition.

In this example, by determining the communication range of the BLE function based on the preset parameters, for example, determining the communication range to be a reasonable small range, an information configuration operation may be performed on the specified wireless network node device(s) within the determined communication range after the wireless network configuration device activates the BLE function, so that the configuration of the wireless network node device is more targeted, and the problem that a large number of wireless network node devices are difficult to be identified is avoided. In addition, the example of the present disclosure simulates the near field communication by using the BLE technology, and effectively avoids the problem that the wireless network node device may be maliciously eavesdropped and invaded in the information configuration process, thereby improving the security of the wireless network node configuration operation.

Furthermore, the configuring of the wireless network node in the example of the present disclosure is simple and efficient, which not only lowers the skill requirements of the related technical personnel, but also effectively improves the working efficiency of the related technical personnel.

Referring to the above-mentioned step S102, in an example of the present disclosure, when the communication range of the BLE function is determined based on the preset parameter, the number of wireless network node devices within the BLE communication range may be preset, and then an appropriate preset parameter is selected based on the preset number of wireless network node devices to determine the communication range of the BLE function. For example, in order to enable the wireless network configuration device to be more targetedly connected to the wireless network node device within its communication range, the number of wireless network node devices within the BLE communication range may be set to be substantially 1 to 2, and then the preset parameter is determined to be 2 meters by considering the spacing between the devices, that is, the BLE communication range of the wireless network configuration device is 2 meters. Certainly, the example of the present disclosure may also set the BLE communication range of the wireless network configuration device to other values, such as 1 meter, 3 meters, 4 meters, and the like, which are not specifically limited in the example of the present disclosure.

Referring to the above-mentioned step S104, in an example of the present disclosure, before performing a data configuration operation on the wireless network node device, the wireless network configuration device is required to first activate its BLE function, and then send a configuration request to each wireless network node device within the determined BLE communication range. In this example, the wireless network configuration device may send a configuration request in the form of a network configuration request broadcast packet to each wireless network node device within the BLE communication range determined above, and the network configuration request broadcast packet may carry address information of the wireless network configuration device, so that a wireless network node device that receives the network configuration request broadcast packet may subsequently establish a connection with the wireless network configuration device by using the address information.

A broadcast packet data packet socket may be used to send broadcast packets to a network supported by many systems. Broadcasting is usually used for two reasons. First, an application (e.g., a program of configuring a wireless network node in a wireless network configuration device) wishes to find a resource in the local network, and the application does not have any a priori knowledge of the address of the resource. Second, some important functions, such as routing, requires that their information is transmitted to all neighbors that may be found. In the example of the present disclosure, the wireless network configuration device sends a network configuration request broadcast packet to each wireless network node device within the BLE communication range, so that the wireless network configuration device does not need to send a configuration request to each wireless network node device, thereby effectively saving the configuration time of the wireless network node device.

Referring to the above-mentioned step S106, in an example of the present disclosure, after receiving an acknowledgment message returned by any wireless network node device in response to the configuration request, the wireless network configuration device may select a wireless network node device that meets the preset condition, and establish a BLE connection with the selected wireless network node device. When the connection is established, if an acknowledgment message returned by only one wireless network node device is received, the wireless network configuration device directly establishes the BLE connection with the wireless network node device. If acknowledgment messages returned by at least two wireless network node devices are received, the wireless network configuration device is required to establish a BLE connection with the wireless network node device that satisfies a preset rule.

In this example, if the preset rule is that the wireless network node device returns the acknowledgement message with the shortest arrival time. Then, after receiving the acknowledgement messages returned by at least two wireless network node devices, the wireless network configuration device may first determine the arrival time of the acknowledgement message returned by the at least two wireless network node devices, respectively, then select the wireless network node device corresponding to the acknowledgement message with the shortest arrival time, and establishes the BLE connection with the wireless network node device. For example, if the wireless network configuration device receives acknowledgement messages returned by two wireless network node devices, and knows by analyzing that the time for the two wireless network node devices to return the acknowledgment message is 2 seconds and 3 seconds, respectively, the wireless network configuration device is connected to the wireless network node device that returns the acknowledgment message in 2 seconds.

If the preset rule is that the wireless network node device returns the acknowledgement message with the strongest RSSI (Received Signal Strength Indication). Then, after receiving the acknowledgement messages returned by at least two wireless network node devices, the wireless network configuration device may analyze the RSSI of the acknowledgement messages returned by the at least two wireless network node devices, respectively, then select the acknowledgement message with the strongest RSSI, and establish the BLE connection with the wireless network node device.

In this example, after receiving the configuration request of the wireless network configuration device, the wireless network node device may return an acknowledgement message in response to the configuration request in the form of an APK packet (message acknowledgement packet) to the wireless network configuration device, that is, the wireless network configuration device receives the APK package returned by the wireless network node device to confirm that the wireless network node device successfully receives the configuration request.

In an optional example of the present disclosure, after establishing the BLE connection with the wireless network node device that meets the preset condition, a read-write operation request may also be sent to the successfully connected wireless network node device so as to perform a wireless network information configuration operation on the wireless network node device. The read-write operation request carries relevant configuration information of the wireless network node device. In this example, the relevant configuration information of the wireless network node device may include a unique identifier of the wireless network node device (e.g., a unique number, unique geographic location information, etc.), a configuration parameter of the wireless network node device, grouping information of the wireless network node device, scene setting information of the wireless network node device, and the like, and may further include other configuration information, which is not specifically limited in the example of the present disclosure.

In this example, before sending the read-write operation request to the successfully connected wireless network node device, the wireless network configuration device may pre-generate a configuration file including relevant configuration information of a plurality of wireless network node devices. After successfully connecting to the wireless network node device, the wireless network configuration device first obtains the unique identifier of the successfully connected wireless network node device, then extracts, based on the obtained unique identifier, relevant configuration information of the wireless network node device corresponding to the unique identifier from the pre-generated configuration file, and sends the configuration information to the successfully connected wireless network node device, thereby performing the wireless network information configuration operation on the wireless network node device.

For example, before sending the read-write operation request to the successfully connected wireless network node device, the wireless network configuration device first establishes a plurality of virtual nodes corresponding to the plurality of wireless network node devices, respectively, and pre-stores each virtual node and the detailed configuration scheme corresponding to each virtual node in the wireless network configuration device (e.g., a handheld terminal equipment) in a form of a configuration file. When the information configuration operation is required to be performed on the wireless network node device, the installer is only required to find the virtual node corresponding to the virtual network node device based on the node location information of the wireless network node device to be configured, obtain the relevant configuration information of the virtual node, and send the configuration information to the wireless network node device by using BLE, thereby achieving the information configuration operation of the wireless network node device. Such information configuration method may greatly lower the skill requirements of the installer.

In order to more clearly illustrate the technical solutions of the examples of the present disclosure, an example of the present disclosure in a particular scenario will be described. In this example, the wireless network configuration device employs a handheld terminal device.

Figure 2:
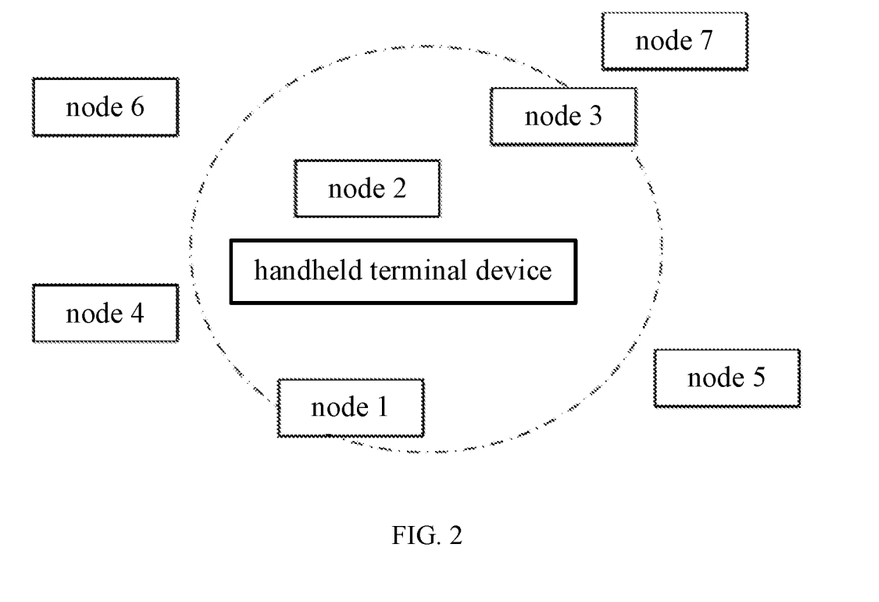
FIG. 2 is a schematic diagram illustrating a communication range of a wireless network configuration device according to an example of the present disclosure.
Figure 3:
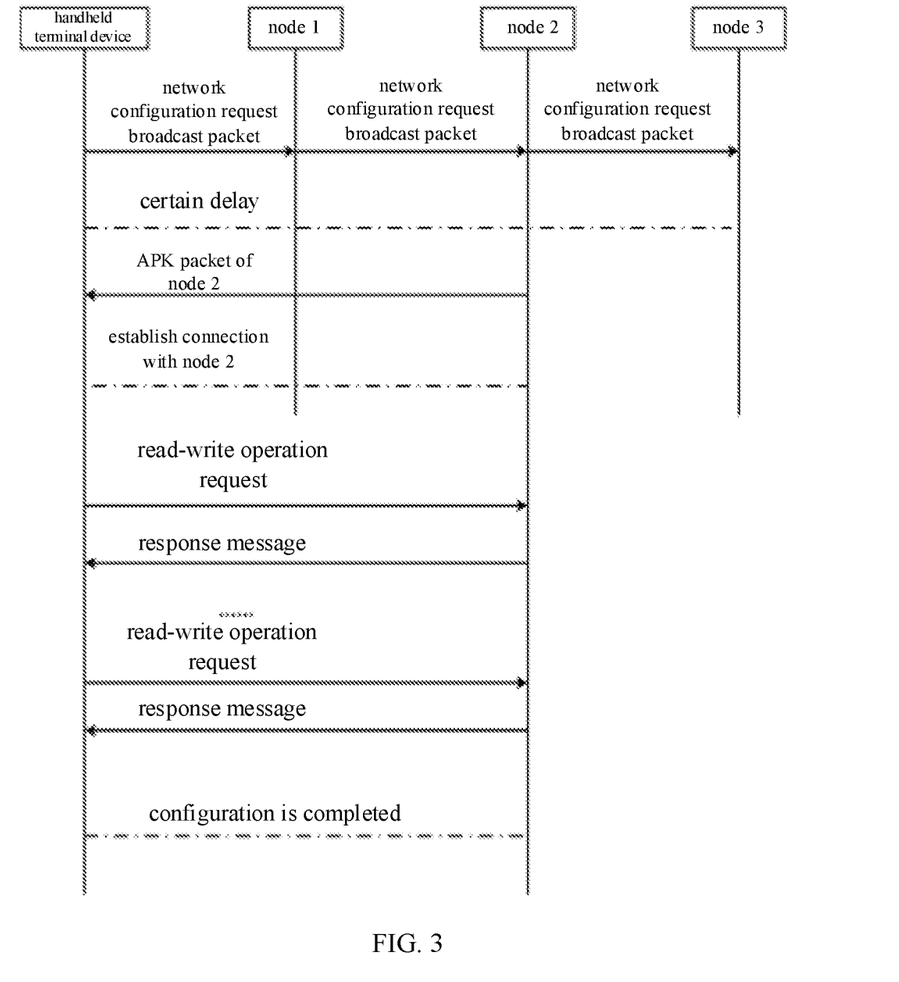
FIG. 3 is a schematic diagram illustrating a process of configuring parameters of a wireless network node device by a wireless network configuration device according to an example of the present disclosure.

First, the BLE communication range of the handheld terminal device is set to be 2 meters, and then the BLE function of the handheld terminal device is activated, and the network configuration request broadcast packet including address information of the handheld terminal device is sent to each wireless network node device within the range of 2 meters. Referring to FIG. 2, within the BLE communication range of 2 meters of the handheld terminal device, there are three wireless network node devices, namely, a wireless network node device 1, a wireless network node device 2, and a wireless network node device 3, which respectively correspond to the node 1, node 2, and node 3 of FIG. 2. In this case, as illustrated in FIG. 3, the handheld terminal device simultaneously sends network configuration request broadcast packets to the wireless network node device of the node 1, the wireless network node device of the node 2, and the wireless network node device of the node 3.

After a certain delay, the wireless network node device of the node 2 sends an ACK packet (i.e., a message acknowledgement packet) to the handheld terminal device based on the address information of the handheld terminal device, that is, the wireless network node device of the node 2 confirms that it successfully receives the network configuration request broadcast packet. Because the handheld terminal device only receives the ACK packet returned by the wireless network node device 2, the handheld terminal device establishes the BLE connection with the wireless network node device 2.

After successfully connecting with the wireless network node device 2, the handheld terminal device first obtains the unique number (for example, 001) of the wireless network node device 2, and then searches the pre-saved configuration file for the virtual node corresponding to the number 001, and acquires relevant configuration information related to the virtual node. For example, if the wireless network node device of the node 2 is a wireless sensor for controlling a lighting fixture, the handheld terminal device may obtain the sensor configuration parameter(s) of the virtual node, and further carry the acquired sensor configuration parameter(s) in the read-write operation request, and send the read-write operation request to the wireless network node device of the node 2. After receiving the sensor configuration parameter(s), the wireless network node device of the node 2 returns a response message to the handheld terminal device, which indicates that the configuration parameter(s) sent this time is successfully configured.

Further, if the handheld terminal device is required to perform other information interaction with the wireless network node device of the node 2, the handheld terminal device may continue to send other configuration parameters to the wireless network node device of the node 2, such as setting the working scene of the wireless network node device of the node 2 to be a "meeting scene", etc. Similarly, after receiving the sensor configuration parameter(s), the wireless network node device of the node 2 also returns a response message to the handheld terminal device, which indicates that the configuration parameter sent this time is successfully configured.

Finally, when the configuring of the wireless network node device of the node 2 is completed and the other wireless network node devices are not required to be configured, the handheld terminal device may turn off the BLE function on the handheld terminal device.

Figure 4:
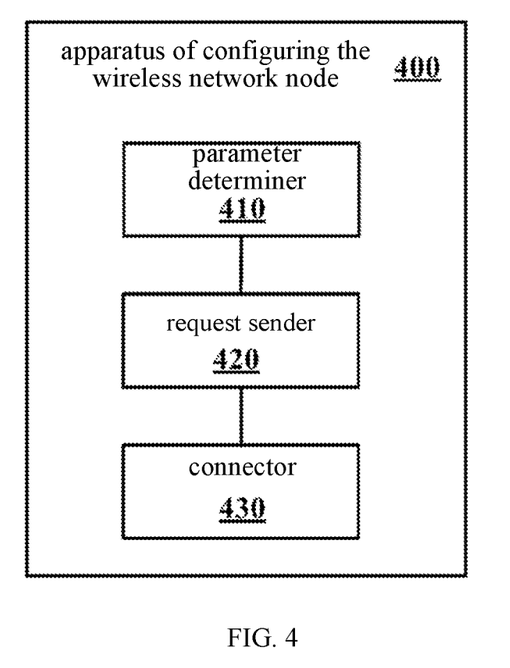
FIG. 4 is a schematic diagram illustrating the structure of an apparatus of configuring a wireless network node according to an example of the present disclosure.

Based on the same inventive concept, the examples of the present disclosure further provide an apparatus of configuring a wireless network node, which is applicable to a wireless network configuration device having a BLE function, and the wireless network configuration device may be a handheld terminal device or other mobile devices. FIG. 4 is a schematic diagram illustrating the structure of an apparatus of configuring a wireless network node according to an example of the present disclosure. Referring to FIG. 4, the apparatus 400 of configuring the wireless network node includes a parameter determiner 410, a request sender 420, and a connector 430.

The functions of the components or devices and the connection relationship between individual parts of the apparatus of configuring the wireless network node of the example of the present disclosure will be described hereinafter:

The parameter determiner 410 determines a communication range of a BLE function based on a preset parameter;

The request sender 420 is connected to the parameter determiner 410, activates the BLE function, and sends a configuration request to each wireless network node device within the determined BLE communication range;

The connector 430 is connected to the request sender 420, receives an acknowledgement message returned by any wireless network node device in response to the configuration request sent by the request sender 420, and establishes a BLE connection with the wireless network node device that meets a preset condition.

In an example of the disclosure, the parameter determiner 410 selects a corresponding preset parameter based on a preset number of the wireless network node devices within the BLE communication range, and determines the communication range of the BLE function.

In an example of the present disclosure, the request sender 420 sends a configuration request in the form of a network configuration request broadcast packet to each wireless network node device within the determined BLE communication range, and the network configuration request broadcast packet carries the address information of the wireless network configuration device.

In an example of the present disclosure, if the connector 430 receives an acknowledgment message returned by only one wireless network node device, the connector 430 establishes a BLE connection with the wireless network node device, and if the connector 430 receives acknowledgment messages returned by at least two wireless network node devices, the connector 430 establishes a BLE connection with the wireless network node device that satisfies a preset rule.

In an example of the disclosure, if the connector 430 receives acknowledgement messages returned by at least two wireless network node devices, the connector 430 determines arrival times of the acknowledgement messages returned by the at least two wireless network node device, selects the wireless network node device corresponding to the acknowledgment message with the shortest arrival time, and establishes a BLE connection with the wireless network node device.

In another example of the present disclosure, if the connector 430 receives acknowledgment messages returned by at least two wireless network node devices, the connector 430 analyzes RSSIs of the acknowledgment messages returned by the at least two wireless network node devices, selects the wireless network node device corresponding to the acknowledgement message with the strongest RSSI, and establishes a BLE connection with the wireless network node device.

Figure 5:
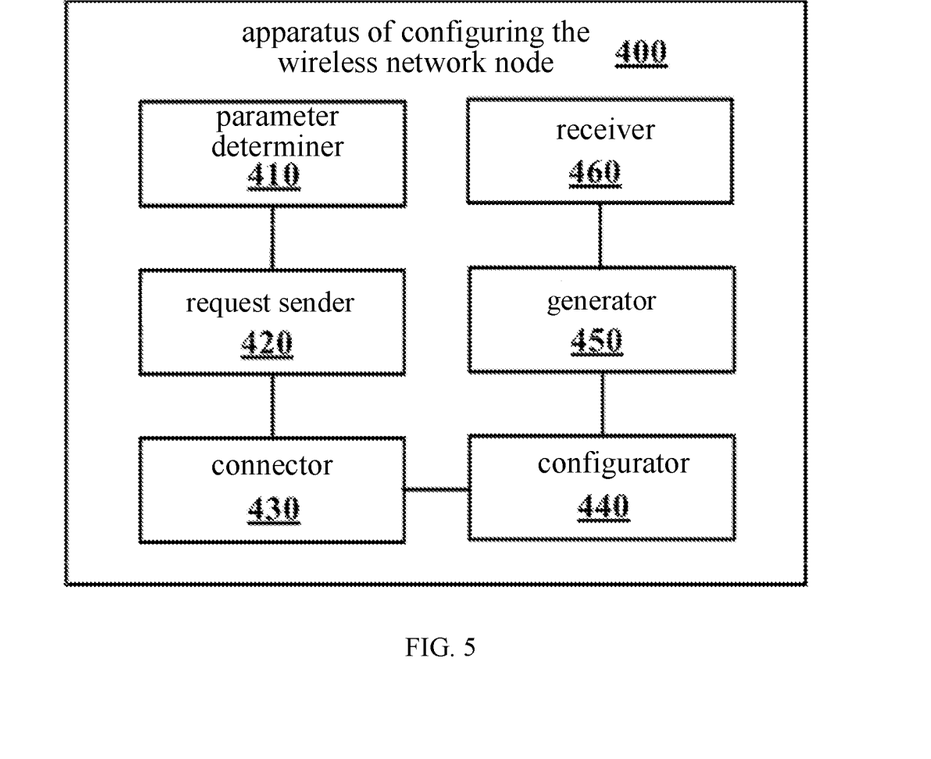
FIG. 5 is a schematic diagram illustrating the structure of an apparatus of configuring a wireless network node according to another example of the present disclosure.

The example of the disclosure further provides another apparatus of configuring a wireless network node, and the wireless network configuration device may be a handheld terminal device or other mobile devices. FIG. 5 is a schematic structural diagram of an apparatus of configuring a wireless network node according to another example of the present disclosure. Referring to FIG. 5, the apparatus 400 of configuring the wireless network node includes a configurator 440, a generator 450, and a receiver 460 in addition to the above components.

The configurator 440 is connected to the connector 430, and sends, after the connector 430 establishes the BLE connection with the wireless network node device that meets the preset condition, a read-write operation request to the wireless network node device successfully connected by the connector 430 so as to perform a wireless network information configuration operation on the wireless network node device. The read-write operation request carries relevant configuration information of the wireless network node device.

The relevant configuration information of the wireless network node device includes a unique identifier of the wireless network node device, a configuration parameter of the wireless network node device, group information of the wireless network node device, and scene setting information of the wireless network node device, and the like.

The generator 450 is connected to the configurator 440, and generates, before the configurator 440 sends the read-write operation request to the successfully connected wireless network node device so as to perform the wireless network information configuration operation on the wireless network node device, a configuration file including relevant configuration information of a plurality of wireless network node devices.

The receiver 460 is connected to the configurator 440, and receives, after the configurator 440 sends the read-write operation request to the successfully connected wireless network node device so as to perform the wireless network information configuration operation on the wireless network node device, a message returned by the wireless network node device indicating that the wireless network information configuration operation is successful.

In an example of the present disclosure, the configurator 440 obtains the unique identifier of the wireless network node device successfully connected by the connector 430, extracts relevant configuration information of the wireless network node device corresponding to the unique identifier from the configuration file based on the unique identifier, and sends the configuration information to the wireless network node device to perform the wireless network information configuration operation on the wireless network node device.

Figure 6:
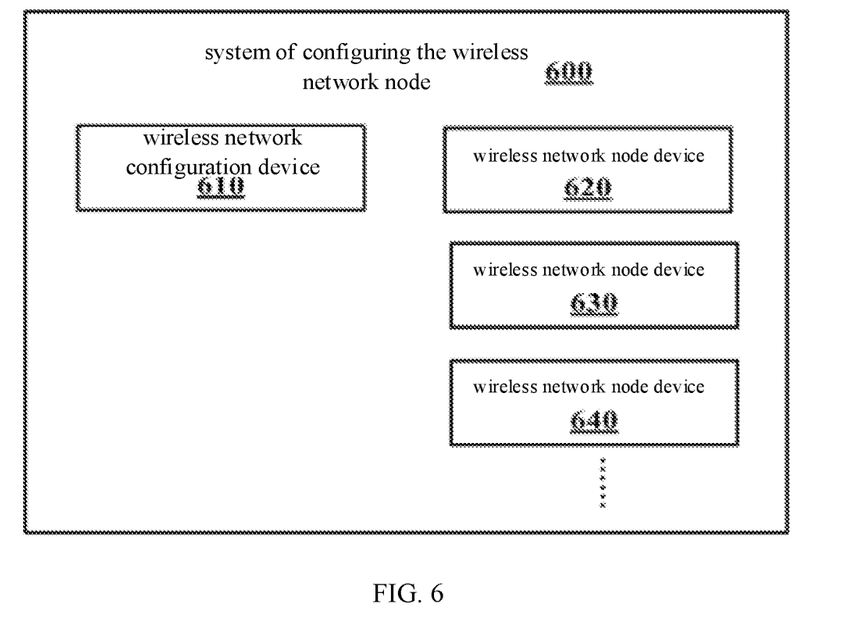
FIG. 6 is a schematic diagram illustrating the structure of a system of configuring a wireless network node according to an example of the present disclosure.

Based on the same inventive concept, the examples of the present disclosure further provide a system of configuring a wireless network node. Referring to FIG. 6, the system 600 of configuring the wireless network node includes a wireless network configuration device 610 and at least one wireless network node device (e.g., including a wireless network node device 620, a wireless network node device 630, a wireless network node device 640, etc.), and each device has a BLE function.

The wireless network configuration device 610 determines a communication range of a BLE function thereof based on a preset parameter.

The wireless network configuration device 610 activates the BLE function and sends a configuration request to each wireless network node device within the determined BLE communication range.

The wireless network node device receiving the configuration request sends an acknowledgement message to the wireless network configuration device to confirm that the configuration request is successfully received.

The wireless network configuration device 610 receives the acknowledgement message returned by the wireless network node device, and establishes a BLE connection with the wireless network node device that meets a preset condition.

Figure 7:
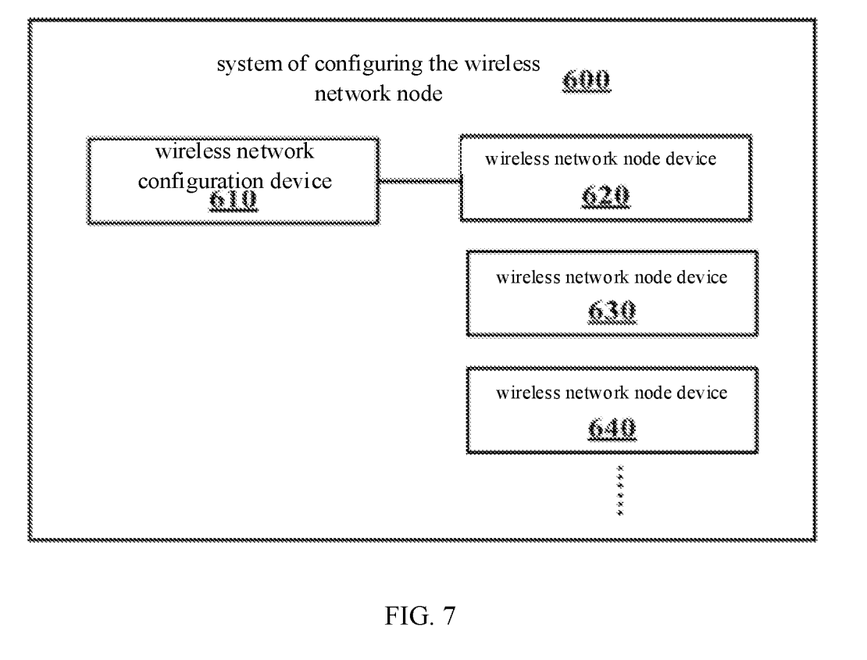
FIG. 7 is a schematic diagram illustrating the structure of a system of configuring a wireless network node according to another example of the present disclosure.

For example, as illustrated in FIG. 7, if only the wireless network node device 620 sends an acknowledgment message to the wireless network configuration device 610 after receiving the configuration request from the wireless network configuration device 610, the wireless network configuration device 610 establishes the connection with the wireless network node device 620.

The examples of the present disclosure further provide a non-transitory computer readable medium storing computer program codes that, when executed by a wireless network configuration device, causes the wireless network configuration device to perform the method of configuring the wireless network node described above.

Figure 8:
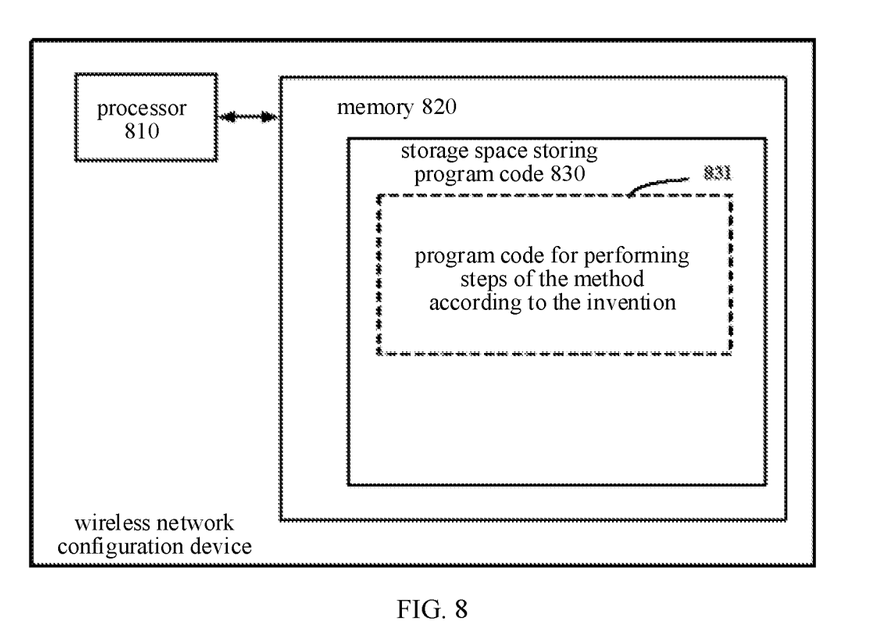
FIG. 8 is a block diagram illustrating a wireless network configuration device for performing a method of configuring a wireless network node according to the present disclosure.
Figure 9:
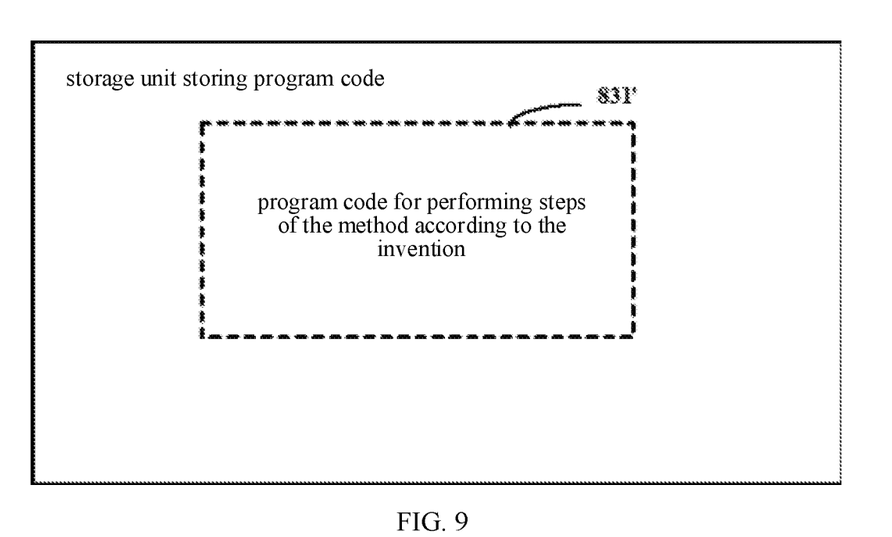
FIG. 9 illustrates a storage unit for storing or carrying program code implementing a method of configuring a wireless network node according to the present disclosure.

For example, FIG. 8 is a block diagram of a wireless network configuration device that may implement the method of configuring the wireless network node according to the present disclosure. The wireless network configuration device conventionally includes a processor 810 and a computer program product or a computer readable medium in the form of a memory 820. The memory 820 may be an electronic memory, such as a flash memory, an EEPROM (Electrically Erasable Programmable Read Only Memory), an EPROM, a hard disk, or a ROM. The memory 820 has a storage space 830 that stores computer program code 831 for performing any step of the method described above. For example, the storage space storing program code 830 may store various computer program code 831 for implementing various steps of the method described above, respectively. The program code may be read from or written to one or more computer program products. These computer program products include program code carriers, such as hard disks, compact disks (CDs), memory cards or floppy disks. Such computer program products are typically portable or fixed storage units as illustrated in FIG. 9.

The storage unit may have a storage section, a storage space arranged similarly to the memory 820 of the wireless network configuration device of FIG. 8, and the like. The computer program code may be compressed, for example, in a suitable form. The storage unit typically includes computer program code 831' storing instructions for performing the method according to the disclosure, i.e. computer program code readable by a processor, for example, processor 810. The computer program code, when executed by the wireless network configuration device, causes the wireless network configuration device to perform individual steps of the method described above.

According to any one of the examples or the combination of the examples, the example of the present disclosure may achieve the following beneficial effects:

In the example of the present disclosure, the method of configuring the wireless network node may be applied to a wireless network configuration device having a Bluetooth low energy (BLE) function. In the process of configuring the wireless network node, the communication range of the BLE function is first determined based on a preset parameter. Then, the BLE function is activated and a configuration request is sent to each of the wireless network node devices within the determined BLE communication range.

Finally, by receiving an acknowledgment message returned by any wireless network node device in response to the configuration request, a BLE connection is established with the wireless network node device that meets a preset condition. In this example, by determining the communication range of the BLE function based on the preset parameters, for example, determining the communication range to be a reasonable small range of small value, an information configuration operation may be performed on the specified wireless network node device within the determined communication range after the wireless network configuration device activates the BLE function, so that the configuring of the wireless network node device is more targeted, and the problem that a large number of wireless network node devices are difficult to be identified is avoided. In addition, the example of the present disclosure simulates the near field communication by using the BLE technology, and effectively avoids the problem that the wireless network node device is maliciously eavesdropped and invaded in the process of the information configuration operation, thereby improving the security of the wireless network node configuration operation.

Further, the configuring of the wireless network node in the example of the present disclosure is simple and efficient, which not only lowers the skill requirements of the related technical personnel, but also effectively improves the working efficiency of the related technical personnel.

In sum, the present disclosure provides a method, an apparatus and a system of configuring a wireless network node.

According to an aspect of the present disclosure, a method of configuring a wireless network node is provided. The method, which is applicable to a wireless network configuration device having a Bluetooth low energy (BLE) function, comprising:
determining a communication range of the BLE function based on a preset parameter;
activating the BLE function, and sending a configuration request to each of a wireless network node device within the determined BLE communication range; and
receiving an acknowledgment message returned by any of the wireless network node device in response to the configuration request and establishing a BLE connection with the wireless network node device that meets a preset condition.

Optionally, after establishing the BLE connection with the wireless network node device that meets the preset condition, the method further comprises:
sending a read-write operation request to the successfully connected wireless network node device so as to perform a wireless network information configuration operation on the wireless network node device, wherein the read-write operation request carries relevant configuration information of the wireless network node device.

Optionally, the determining the communication range of the BLE function based on the preset parameter comprises:
selecting a corresponding preset parameter based on a preset number of the wireless network node device within the BLE communication range, and determining the communication range of the BLE function.

Optionally, the sending the configuration request to each of the wireless network node device within the determined BLE communication range comprises:
sending the configuration request in a form of a network configuration request broadcast packet to each of the wireless network node device within the determined BLE communication range, wherein the network configuration request broadcast packet carries address information of the wireless network configuration device.

Optionally, the receiving the acknowledgment message returned by any of the wireless network node device in response to the configuration request and establishing the BLE connection with the wireless network node device that meets the preset condition comprises:
in a case where an acknowledgment message returned by only one of the wireless network node device is received, establishing the BLE connection with the only one of the wireless network node device; and
in a case where acknowledgment messages returned by at least two of the wireless network node device are received, establishing the BLE connection with the wireless network node device that satisfies a preset rule.

Optionally, the establishing the BLE connection with the wireless network node device that satisfies the preset rule comprises:
determining arrival times of the acknowledgement messages returned by the at least two of the wireless network node devices; and
selecting the wireless network node device corresponding to the acknowledgement message with a shortest arrival time, and establishing the BLE connection with the wireless network node device corresponding to the acknowledgement message with the shortest arrival time.

Optionally, the establishing the BLE connection with the wireless network node device that satisfies the preset rule comprises:
analyzing received signal strength indications (RSSIs) of the acknowledgement messages returned by the at least two of the wireless network node devices; and
selecting the wireless network node device corresponding to the acknowledgement message with a strongest RSSI, and establishing the BLE connection with the wireless network node device corresponding to the acknowledgement message with the strongest RSSI.

Optionally, the relevant configuration information of the wireless network node device comprises at least one of:
a unique identifier of the wireless network node device;
configuration parameters of the wireless network node device;
grouping information of the wireless network node device; and scene setting information of the wireless network node device.

Optionally, before sending the read-write operation request to the successfully connected wireless network node device so as to perform the wireless network information configuration operation on the wireless network node device, the method further comprises: generating a configuration file, wherein the configuration file comprises configuration information of a plurality of wireless network node devices.

Optionally, the sending the read-write operation request to the successfully connected wireless network node device so as to perform the wireless network information configuration operation on the wireless network node device comprising:
obtaining the unique identifier of the successfully connected wireless network node device; and
extracting, based on the obtained unique identifier, the relevant configuration information of the wireless network node device corresponding to the unique identifier from the configuration file, and sending the configuration information to the wireless network node device to perform the wireless network information configuration operation on the wireless network node device.

Optionally, after sending the read-write operation request to the successfully connected wireless network node device so as to perform the wireless network information configuration operation on the wireless network node device, the method further comprises: receiving a message returned by the wireless network node device, wherein the message indicates that the wireless network information configuration operation is successful.

According to another aspect of the present disclosure, an apparatus of configuring a wireless network node is further provided, the apparatus being applicable to a wireless network configuration device having a BLE function and comprising:
a parameter determiner determining a communication range of the BLE function based on a preset parameter
a request sender connected to the parameter determiner, activating the BLE function, and sending a configuration request to each of a wireless network node device within the determined BLE communication range; and
a connector connected to the request sender, receiving an acknowledgement message returned by any of the wireless network node device in response to the configuration request of the request sender, and establishing a BLE connection with the wireless network node device that meets a preset condition.

Optionally, the apparatus further comprises:
a configurator connected to the connector, and sending, after the connector establishes the BLE connection with the wireless network node device that meets the preset condition, a read-write operation request to the wireless network node device successfully connected by the connector so as to perform a wireless network information configuration operation on the wireless network node device, wherein the read-write operation request carries relevant configuration information of the wireless network node device.

Optionally, the parameter determiner selects a corresponding preset parameter based on a preset number of the wireless network node device within the BLE communication range, and determines the communication range of the BLE function.

Optionally, the request sender sends the configuration request in a form of a network configuration request broadcast packet to each of the wireless network node device within the BLE communication range determined by the parameter determiner, wherein the network configuration request broadcast packet carries address information of the wireless network configuration device.

Optionally, in a case where the connector receives an acknowledgment message returned by only one of the wireless network node device, the connector establishes the BLE connection with the only one of the wireless network node device; and in a case where the connector receives acknowledgment messages returned by at least two of the wireless network node device, the connector establishes the BLE connection with the wireless network node device that satisfies a preset rule.

Optionally, in the case where the connector receives the acknowledgment messages returned by the at least two of the wireless network node device, the connector determines arrival times of the acknowledgement messages returned by the at least two wireless network node devices; and
the connector selects the wireless network node device corresponding to the acknowledgement message with a shortest arrival time, and establishes the BLE connection with the wireless network node device corresponding to the acknowledgement message with the shortest arrival time.

Optionally, in the case where the connector receives the acknowledgment messages returned by the at least two of the wireless network node device, the connector analyzes RSSIs of the acknowledgement messages returned by the at least two wireless network node devices; and the connector selects the wireless network node device corresponding to the acknowledgement message with a strongest RSSI, and establishes the BLE connection with the wireless network node device corresponding to the acknowledgement message with the strongest RSSI.

Optionally, the relevant configuration information of the wireless network node device comprises at least one of:
a unique identifier of the wireless network node device;
configuration parameters of the wireless network node device;
grouping information of the wireless network node device; and
scene setting information of the wireless network node device.

Optionally, the apparatus further comprise:
a generator connected to the configurator, and generating a configuration file before the configurator sends the read-write operation request to the successfully connected wireless network node device so as to perform the wireless network information configuration operation on the wireless network node device, wherein the configuration file comprises configuration information of a plurality of wireless network node devices.

Optionally, the configurator obtains the unique identifier of the wireless network node device successfully connected by the connector; and
the configurator extracts, based on the unique identifier, the relevant configuration information of the wireless network node device corresponding to the unique identifier from the configuration file, and sends the configuration information to the wireless network node device to perform the wireless network information configuration operation on the wireless network node device.

Optionally, the apparatus further comprise:
a receiver connected to the configurator, and receiving, after the configurator sends the read-write operation request to the successfully connected wireless network node device so as to perform the wireless network information configuration operation on the wireless network node device, a message returned by the wireless network node device, wherein the message indicates that the wireless network information configuration operation is successful.

According to still another aspect of the present disclosure, a system of configuring a wireless network node is further provided. The system comprises a wireless network configuration device and at least one wireless network node device, and each of the wireless network configuration device and at least one wireless network node device has a BLE function, wherein the wireless network configuration device determines a communication range of the BLE function based on a preset parameter;

the wireless network configuration device activates a BLE function and sends a configuration request to each of the wireless network node device within the determined BLE communication range;

the wireless network node device receiving the configuration request sends an acknowledgement message to the wireless network configuration device so as to confirm that the configuration request is successfully received; and the wireless network configuration device receives the acknowledgement message returned by the wireless network node device, and establishes a BLE connection with the wireless network node device that meets a preset condition.

According to still another aspect of the present disclosure, a computer readable medium is further provided. The computer readable medium stores computer program code which, when executed on a wireless network configuration device, causes the wireless network configuration device to perform the method of configuring the wireless network node described above.

In the example of the present disclosure, the method of configuring the wireless network node may be applied to a wireless network configuration device having a Bluetooth low energy (BLE) function. In the process of configuring the wireless network node, the communication range of the BLE function is first determined based on preset parameters. Then, the BLE function is activated and a configuration request is sent to each of the wireless network node device(s) within the determined BLE communication range.

Finally, by receiving an acknowledgment message returned by any wireless network node device in response to the configuration request, a BLE connection is established with the wireless network node device that meets the preset condition. In this example, by determining the communication range of the BLE function based on the preset parameter, for example, determining the communication range to be a reasonable small range, an information configuration operation may be performed on the specified wireless network node device within the determined communication range after the wireless network configuration device activates the BLE function, so that the configuring of the wireless network node device is more targeted, and the problem that a large number of wireless network node devices are difficult to be identified is avoided. In addition, the example of the present disclosure simulates the near field communication by using the BLE technology, and effectively avoids the problem that the wireless network node device is maliciously eavesdropped and invaded in the information configuration process, thereby improving the security of the wireless network node configuration operation.

Further, the configuring of the wireless network node in the example of the present disclosure is simple and efficient, which not only lowers the skill requirements of the related technical personnel, but also effectively improves the working efficiency of the related technical personnel.

The above description is only an overview of the technical solutions of the present disclosure, and the technical solutions of the present disclosure can be implemented in accordance with the contents of the description for a clearer understanding. The examples of the disclosure not only avoid the problem of identifying a large number of wireless network node devices, but also effectively avoid the problem that the wireless network node device is maliciously eavesdropped and invaded in the information configuration process, thereby improving the security of the wireless network node configuration operation.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The objects, technical solutions, and advantageous effects of the present disclosure are further described in detail in the particular examples described above. However, it should be understood that the foregoing description is only illustrative of particular examples of the present disclosure, and is not intended to limit the disclosure. All modifications, equivalent substitutions, improvements, etc., made within the spirit and scope of the present disclosure are intended to be included within the scope of the present disclosure.

What is claimed is:

1. A method of configuring a wireless network node, applied to a wireless network configuration device having a Bluetooth low energy (BLE) function, comprising:
   determining a communication range of the BLE function based on a preset parameter;
   activating the BLE function, and sending a configuration request to each of wireless network node devices within the determined BLE communication range; and
   receiving an acknowledgment message returned by a wireless network node device in response to the configuration request and establishing a BLE connection with the wireless network node device that meets a preset condition, and
   establishing the BLE connection according to a preset rule when at least two acknowledgment messages are received from at least two the wireless network node devices.

2. The method according to claim 1, after establishing the BLE connection with the wireless network node device that meets the preset condition, further comprising:
   sending a read-write operation request to the connected wireless network node device so as to perform a wireless network information configuration operation on the wireless network node device, wherein the read-write operation request carries relevant configuration information of the wireless network node device.

3. The method according to claim 1, wherein determining the communication range of the BLE function based on the preset parameter comprises:
selecting a corresponding preset parameter based on a preset number of the wireless network node device within the BLE communication range, and determining the communication range of the BLE function.

4. The method according to claim 1, wherein sending the configuration request to each of the wireless network node devices within the determined BLE communication range comprises:
sending the configuration request in a form of a network configuration request broadcast packet to each of the wireless network node devices within the determined BLE communication range, wherein the network configuration request broadcast packet carries address information of the wireless network configuration device.

5. The method according to claim 1, wherein receiving the acknowledgment message returned by the wireless network node device in response to the configuration request and establishing the BLE connection with the wireless network node device that meets the preset condition comprises:
in a case where an acknowledgment message returned by one wireless network node device is received, establishing the BLE connection with the one wireless network node device.

6. The method according to claim 1, wherein establishing the BLE connection according to the preset rule comprises:
determining arrival times of the acknowledgement messages returned by the at least two of the wireless network node device; and
selecting one wireless network node device corresponding to the acknowledgement message with a shortest arrival time, and establishing the BLE connection with the one wireless network node device corresponding to the acknowledgement message with the shortest arrival time.

7. The method according to claim 1, wherein the establishing the BLE connection according to the preset rule comprises:
analyzing received signal strength indications (RSSIs) of the acknowledgement messages returned by the at least two of the wireless network node device; and
selecting one wireless network node device corresponding to the acknowledgement message with a strongest RSSI, and establishing the BLE connection with the one wireless network node device corresponding to the acknowledgement message with the strongest RSSI.

8. The method according to claim 2, wherein the relevant configuration information of the wireless network node device comprises at least one of:
a unique identifier of the wireless network node device;
a configuration parameter of the wireless network node device;
grouping information of the wireless network node device; and
scene setting information of the wireless network node device.

9. The method according to claim 8, before sending the read-write operation request to the connected wireless network node device so as to perform the wireless network information configuration operation on the wireless network node device, further comprising:
generating a configuration file, wherein the configuration file comprises configuration information of a plurality of wireless network node devices.

10. The method according to claim 9, wherein sending the read-write operation request to the connected wireless network node device so as to perform the wireless network information configuration operation on the wireless network node device comprises:
obtaining the unique identifier of the connected wireless network node device; and
extracting, based on the obtained unique identifier, the relevant configuration information of the wireless network node device corresponding to the unique identifier from the configuration file, and sending the configuration information to the wireless network node device to perform the wireless network information configuration operation on the wireless network node device.

11. The method according to claim 2, after sending the read-write operation request to the connected wireless network node device so as to perform the wireless network information configuration operation on the wireless network node device, further comprising:
receiving a message returned by the wireless network node device, wherein the message indicates that the wireless network information configuration operation is successful.

12. A non-transitory computer readable medium storing computer program code which, when executed on a wireless network configuration device, causes the wireless network configuration device to perform the method of configuring the wireless network node according to claim 1.

13. An apparatus of configuring a wireless network node that is applicable to a wireless network configuration device having a BLE function, comprising:
a parameter determiner that determines a communication range of the BLE function based on a preset parameter;
a request sender connected to the parameter determiner, wherein the request sender activates the BLE function and sends a configuration request to each of wireless network node devices within the determined BLE communication range; and
a connector connected to the request sender, wherein the connector receives an acknowledgement message returned by a wireless network node device in response to the configuration request of the request sender and establishes a BLE connection with the wireless network node device that meets a preset condition, wherein
in a case where the connector receives an acknowledgment message returned by one wireless network node device, the connector establishes the BLE connection with the one wireless network node device, and
in a case where the connector receives acknowledgment messages returned by at least two wireless network node devices, the connector establishes the BLE connection according to a preset rule, wherein the connector determines arrival times of the acknowledgement messages returned by the at least two wireless network node devices, and
the connector selects one wireless network node device corresponding to the acknowledgement message with a shortest arrival time, and establishes the BLE connection with the one wireless network node device corresponding to the acknowledgement message with the shortest arrival time.

14. The apparatus of configuring the wireless network node according to claim 13, further comprising:
a configurator connected to the connector, and wherein the configurator sends, after the connector establishes the BLE connection with the wireless network node device that meets the preset condition, a read-write operation request to the wireless network node device connected by the connector so as to perform a wireless network information configuration operation on the wireless network node device, wherein the read-write operation request carries relevant configuration information of the wireless network node device.

15. The apparatus of configuring the wireless network node according to claim 13, wherein
the parameter determiner selects a corresponding preset parameter based on a preset number of the wireless network node device within the BLE communication range and determines the communication range of the BLE function.

16. The apparatus of configuring the wireless network node according to claim 13, wherein
the request sender sends the configuration request in a form of a network configuration request broadcast packet to each of the wireless network node devices within the BLE communication range determined by the parameter determiner, wherein the network configuration request broadcast packet carries address information of the wireless network configuration device.

17. The apparatus of configuring the wireless network node according to claim 13, wherein, in the case where the connector receives the acknowledgment messages returned by the at least two wireless network node devices,
the connector analyzes RSSIs of the acknowledgement messages returned by the at least two wireless network node devices; and
the connector selects one wireless network node device corresponding to the acknowledgement message with a strongest RSSI, and establishes the BLE connection with the one wireless network node device corresponding to the acknowledgement message with the strongest RSSI.

18. A system of configuring a wireless network node, which comprises a wireless network configuration device and at least one wireless network node device, wherein the at least one wireless network node device has a BLE function, and wherein
the wireless network configuration device determines a communication range of the BLE function based on a preset parameter;
the wireless network configuration device activates the BLE function and sends a configuration request to each of the at least one wireless network node device within the determined BLE communication range;
the wireless network node device receiving the configuration request sends an acknowledgement message to the wireless network configuration device so as to confirm that the configuration request is received; and
the wireless network configuration device receives the acknowledgement message returned by the wireless network node device, and establishes a BLE connection with the wireless network node device that meets a preset condition, wherein
in a case where the wireless network configuration device receives an acknowledgment message returned by one wireless network node device, the wireless network configuration device establishes the BLE connection with the one wireless network node device, and
in a case where the wireless network configuration device receives acknowledgment messages returned by at least two wireless network node devices, the wireless network configuration device establishes the BLE connection according to a preset rule, wherein the wireless network configuration device determines arrival times of the acknowledgement messages returned by the at least two wireless network node devices, and
the wireless network configuration device selects one wireless network node device corresponding to the acknowledgement message with a shortest arrival time, and establishes the BLE connection with the one wireless network node device corresponding to the acknowledgement message with the shortest arrival time.

* * * * *